UNITED STATES PATENT OFFICE.

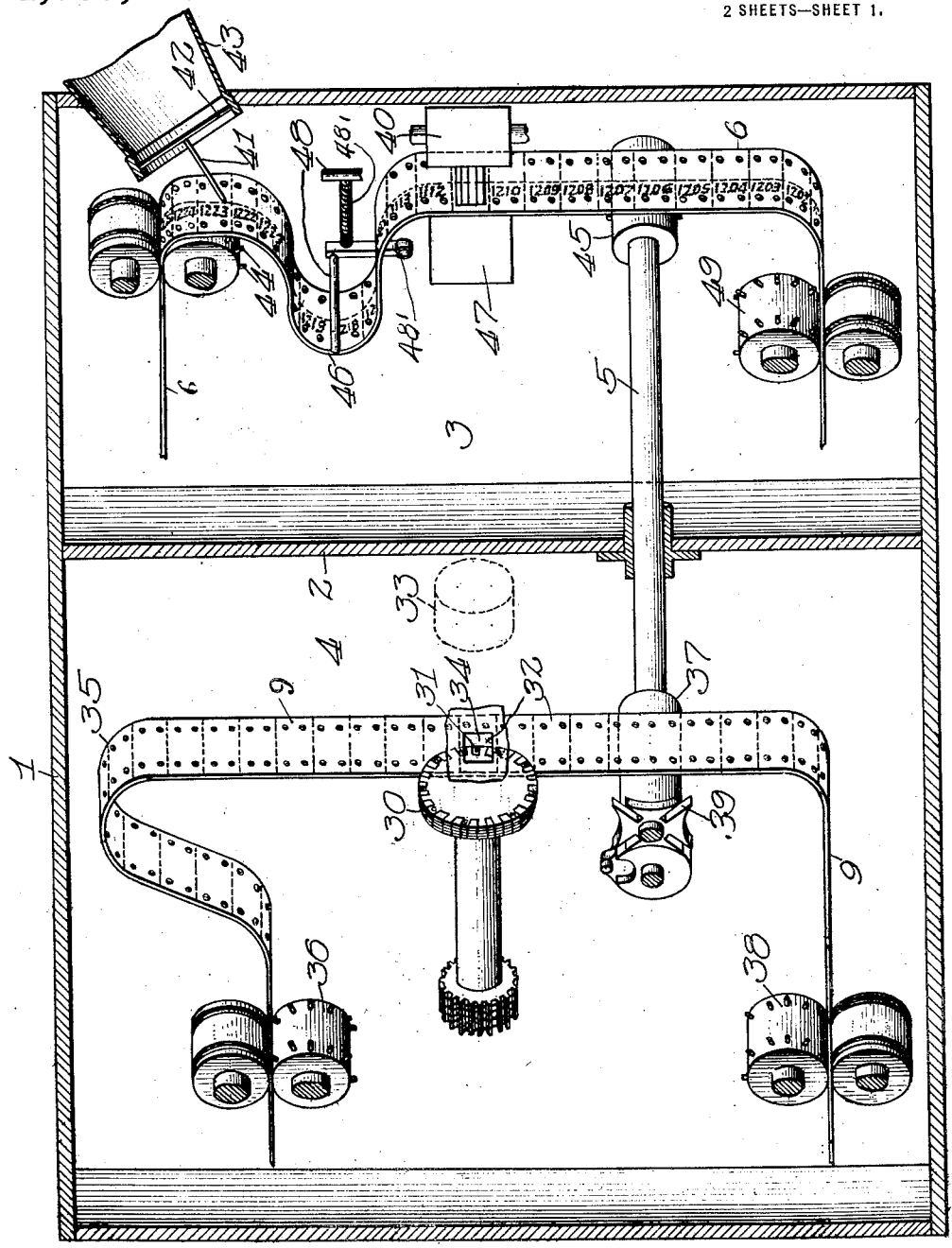

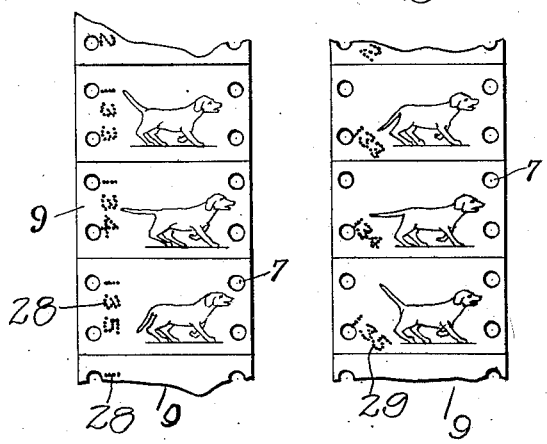

WILLIAM ERASTUS WILLIAMS, OF CHICAGO, ILLINOIS.

MEANS FOR COÖRDINATING SOUND AND MOTION-PICTURE RECORDS.

1,389,407.  Specification of Letters Patent.  Patented Aug. 30, 1921.

Application filed July 10, 1913. Serial No. 778,258.

*To all whom it may concern:*

Be it known that I, WILLIAM ERASTUS WILLIAMS, a citizen of the United States, and a resident of Chicago, county of Cook, and State of Illinois, have invented a new and useful Improvement in the Means for Coördinating Sound and Motion-Picture Records, of which the following is a specification.

The object of my invention is to provide for synchronously reproducing in a practicable way sound and motion picture records.

The accompanying drawings illustrate, diagrammatically, apparatus for carrying out my invention.

Figure 1, is a perspective view of such parts only of the machinery as may be necessary to illustrate a means for properly marking the two records.

Fig. 2, is a detail of the film picture record.

Fig. 3, shows a slight modification of the film of Fig. 2.

Fig. 4, is a view of the sound record.

In the drawings 1, Fig. 1, indicates a suitable casing having a partition 2 which divides it into compartments 3, 4, for containing, respectively, any suitable sound recording apparatus and any suitable photographic apparatus, which may be a moving picture camera. The mechanisms in the two compartments are connected by any suitable devices for securing synchronous operation, shown in this instance as a shaft 5. The sound record may be of any suitable form or construction, but I prefer to use a flexible band or strip 6 consisting of or coated with any suitable material, such as gum, wax, pulp, or other material suited for my purpose. The strip 6 is provided with perforations 7 (Fig. 4) analogous to those of ordinary picture film and serving a like purpose, and has a central area to receive a sound record 8 and a space alongside this area to receive indentifying marks 10, preferably formed by perforating the band, so that light passing through the perforations may make them readily and quickly distinguishable, even in the usual dark room, or elsewhere where the band may be inspected.

The photographic film 9 (Figs. 1, 2, 3) is identically perforated, so far as longitudinal spacing is concerned, and each picture space corresponds to a like space on the sound record strip, although I do not restrict myself to spaces of equal longitudinal extent on the two strips.

The mechanisms employed are shown only diagrammatically. The photographic strip is fed by the usual sprocket drums 36, 38, a loop 35 being formed in the ordinary way, and the intermediate portion is advanced intermittently past an exposure opening 34, in the axis of a lens 33, by a drum 37 upon the shaft 5, which is intermittently rotated by a common star wheel device 39. As the film advances, and during its periods of rest or otherwise, each picture space is perforated by a numbering wheel 30, actuated in any suitable way, the wheel and its actuating devices being without novelty herein claimed.

The sound record strip is similarly fed by sprocket drums 44, 49 and a drum 45 on the shaft 5, so that its advancing steps are in exact time with those of the film strip 9. The loop 46 of this strip is preferably held deflected by an arm 48 pivotally supported at 48', and gently urged toward the film by a spring $48_1$, thus creating a slight tension here quite desirable. The sound record is made by a stylus 41, carried by a diaphragm 42 of a suitable horn 43. The identifying marks are applied to this strip by a punch 40 working against a platen 47 and operated synchronously with the numbering wheel 30 in the other compartment, by devices not shown. In other words, the same number is applied to both strips at the same instant, so that when the records are reproduced, the sound and picture records may at any time be brought into exact accord. The marking has the further advantage of affording a check upon careless operators who may destroy portions of the record.

As shown, the sound record is made upon a constantly moving portion of the strip, but the punching may be done during periods of rest or otherwise.

In case it is desired to have the picture and sound records made at a distance from each other greater than it may be when both are within the same casing 1, the two mechanisms may be separated, and the synchronizing may be secured by means analogous to that shown, or by synchronized clock work, synchronized electric motors, or otherwise.

What I claim is:—

A talking picture apparatus including means for producing a film carrying a sound record a separate film carrying a picture record, and means for placing, simultaneously with the making of the sound and picture records, a series of corresponding identification marks along the marginal traction edges of the films throughout their length, whereby the said two films may be mechanically united at any point throughout their length for synchronous reproduction.

In witness whereof, I have hereunto subscribed my name in the city of Chicago, State of Illinois, on the 3rd day of February, 1913, in the presence of two subscribing witnesses.

WILLIAM ERASTUS WILLIAMS.

Witnesses:
 August C. Riechers,
 Geo. E. Miller.